United States Patent
Kitamoto

(10) Patent No.: US 10,156,832 B2
(45) Date of Patent: Dec. 18, 2018

(54) ELECTRIC POWER STEERING SYSTEM

(71) Applicant: JTEKT CORPORATION, Osaka-shi, Osaka (JP)

(72) Inventor: Hiroshi Kitamoto, Toyota (JP)

(73) Assignee: JTEKT CORPORATION, Osaka-shi (JP)

(*) Notice: Subject to any disclaimer, the term of this patent is extended or adjusted under 35 U.S.C. 154(b) by 0 days.

(21) Appl. No.: 15/493,624

(22) Filed: Apr. 21, 2017

(65) Prior Publication Data
US 2017/0315514 A1 Nov. 2, 2017

(30) Foreign Application Priority Data

Apr. 28, 2016 (JP) ................................. 2016-091635

(51) Int. Cl.
| H02P 25/22 | (2006.01) |
| G05B 13/02 | (2006.01) |
| B62D 5/04 | (2006.01) |
| H02P 21/22 | (2016.01) |

(52) U.S. Cl.
CPC ............. *G05B 13/02* (2013.01); *B62D 5/046* (2013.01); *B62D 5/0463* (2013.01); *H02P 21/22* (2016.02); *H02P 25/22* (2013.01); *B62D 5/0409* (2013.01)

(58) Field of Classification Search
CPC ...... B62D 5/0409; B62D 5/0463; H02P 25/22
See application file for complete search history.

(56) References Cited

U.S. PATENT DOCUMENTS

| 2005/0125124 A1* | 6/2005 | Nagase .................. B62D 5/046 701/41 |
| 2005/0178609 A1 | 8/2005 | Uryu |
| 2005/0237016 A1* | 10/2005 | Asano ................ G01D 5/24457 318/432 |
| 2005/0280383 A1 | 12/2005 | Kifuku |
| 2011/0074320 A1* | 3/2011 | Nakamura ................ H02P 5/74 318/400.02 |
| 2011/0175558 A1* | 7/2011 | Kitanaka ............... B60L 15/025 318/400.3 |
| 2012/0187893 A1* | 7/2012 | Baba ..................... H02P 25/021 318/722 |

(Continued)

FOREIGN PATENT DOCUMENTS

| EP | 2803556 A1 | 11/2014 |
| FR | 2866303 A1 | 8/2005 |

(Continued)

OTHER PUBLICATIONS

Dec. 5, 2017 Search Report issued in European Patent Application No. 17167823.8.

*Primary Examiner* — Muhammad S Islam
(74) *Attorney, Agent, or Firm* — Oliff PLC

(57) ABSTRACT

In an electric power steering system, an offset correction value setting unit corrects second offset correction values in a state where 100% of current command values is distributed to a first control unit, and 0% of the current command values is distributed to a second control unit. The offset correction value setting unit corrects first offset correction values in a state where 100% of the current command values is distributed to the second control unit, and 0% of the current command values is distributed to the first control unit.

6 Claims, 7 Drawing Sheets

(56) References Cited

U.S. PATENT DOCUMENTS

| | | | |
|---|---|---|---|
| 2013/0049656 A1* | 2/2013 | Yasui | H02P 21/00 318/400.02 |
| 2013/0334995 A1* | 12/2013 | Kuroda | H02P 27/06 318/400.27 |
| 2015/0244298 A1* | 8/2015 | Takaki | H02P 21/32 318/400.02 |
| 2015/0298727 A1 | 10/2015 | Kimpara et al. | |

FOREIGN PATENT DOCUMENTS

| | | |
|---|---|---|
| JP | 2006-082579 A | 3/2006 |
| WO | 2013/105225 A1 | 7/2013 |

\* cited by examiner

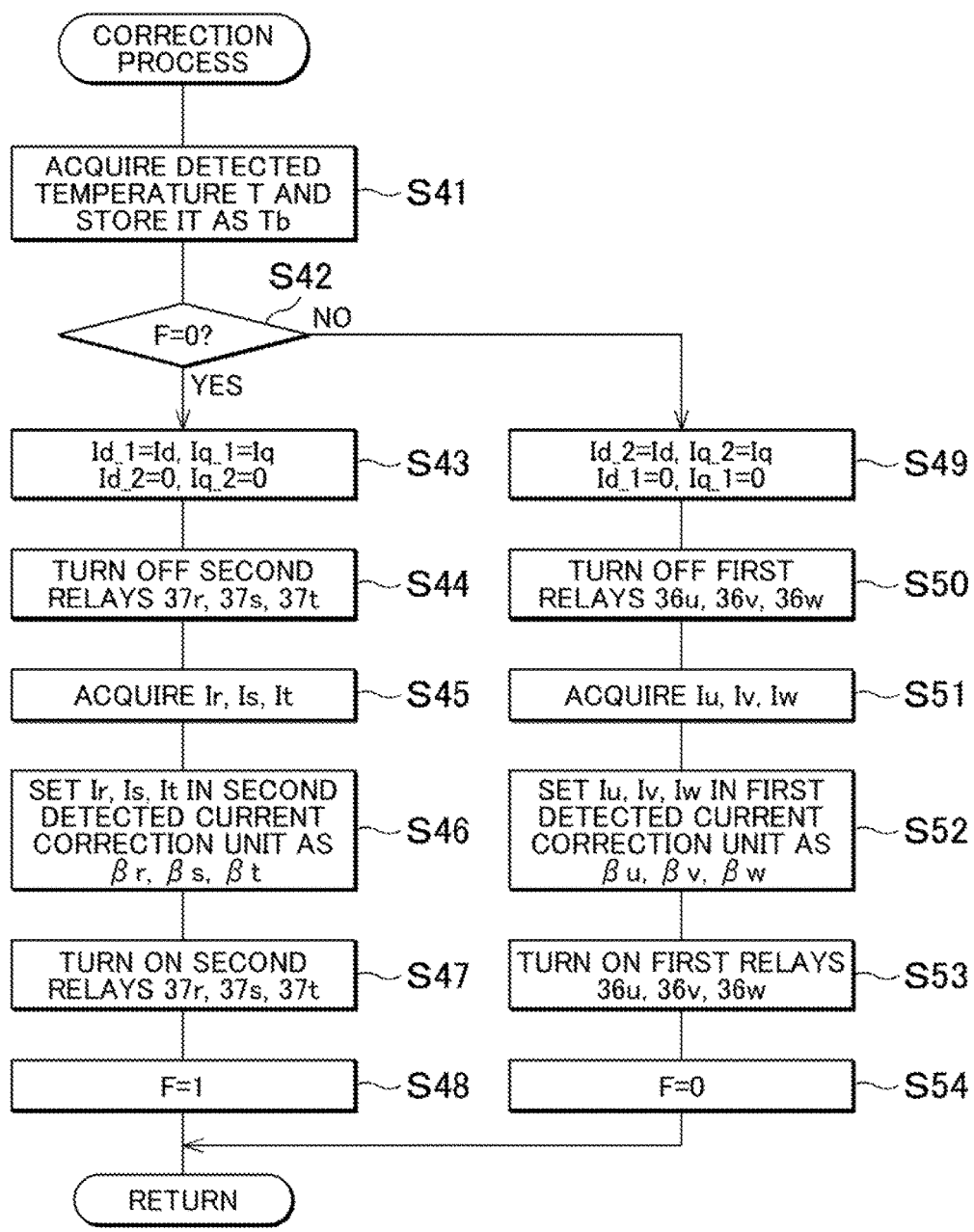

ELECTRIC POWER STEERING SYSTEM

INCORPORATION BY REFERENCE

The disclosure of Japanese Patent Application No. 2016-091635 filed on Apr. 28, 2016 including the specification, drawings and abstract, is incorporated herein by reference in its entirety.

BACKGROUND OF THE INVENTION

1. Field of the Invention

The invention relates to an electric power steering system.

2. Description of the Related Art

Japanese Patent Application Publication No. 2006-82579 (JP 2006-82579 A) describes an electric power steering system including: a command value generation unit that generates a three-phase current command value based on a steering torque and so forth; a current detection unit that detects a U-phase current and a W-phase current; an adding unit that subtracts offset correction values corresponding to the U-phase current and the W-phase current that are detected by the current detection unit, respectively from the U-phase current and the W-phase current; means for comparing the U-phase current and the W-phase current after the offset correction, which are acquired by the adding unit, with the three-phase current command value to calculate a control deviation; a current control unit that controls a driving circuit of a motor based on the control deviation; and an offset correction unit.

The offset correction unit includes a table storing an offset correction value for each temperature and provided for each of the U-phase current and the W-phase current. The offset correction unit has a function of providing an offset correction value corresponding to a current temperature to the adding unit. In addition, the offset correction unit has a function of acquiring the U-phase current and the W-phase current that are detected by the current detection unit when no current is applied to the motor, and updating an offset correction value corresponding to the temperature at that time stored in the table, based on the acquired U-phase current and W-phase current. WO 2013/105225 also describes related art.

According to the invention described in JP 2006-82579 A, an offset correction value can be corrected only when the motor current is zero. That is, the offset correction value cannot be corrected during an operation of the electric power steering system. Thus, when temperature varies during the operation of the electric power steering system, a detected current error may increase.

SUMMARY OF THE INVENTION

One object of the invention is to provide an electric power steering system configured to correct a correction value to be used for offset correction of a detected current, during an operation of the electric power steering system.

An electric power steering system according to an aspect of the invention includes: an electric motor including a first coil and a second coil; a first driving circuit configured to supply electric power to the first coil; a second driving circuit configured to supply electric power to the second coil; a first current detector configured to detect a current flowing through the first coil; a second current detector configured to detect a current flowing through the second coil; a first corrector configured to apply offset correction to a first detected current detected by the first current detector, based on a first correction value; a second corrector configured to apply offset correction to a second detected current detected by the second current detector, based on a second correction value; a command value calculator configured to calculate a basic current command value of the electric motor, a distributor configured to divide the basic current command value into a first current command value and a second current command value; a first controller configured to control the first driving circuit, based on the first detected current after the offset correction by the first corrector, and the first current command value; a second controller configured to control the second driving circuit, based on the second detected current after the offset correction by the second corrector, and the second current command value; and a third corrector configured to correct the first correction value and the second correction value. The third corrector is configured to i) correct the second correction value while the distributor is controlled such that 100% of the basic current command value is the first current command value, and 0% of the basic current command value is the second current command value, and ii) correct the first correction value while the distributor is controlled such that 100% of the basic current command value is the second current command value, and 0% of the basic current command value is the first current command value.

With this configuration, the first correction value or the second correction value can be corrected during the operation of the electric power steering system.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 7 is a flowchart illustrating a detailed procedure of a process in step S34 in FIG. 6.

DETAILED DESCRIPTION OF EMBODIMENTS

Figure 1:
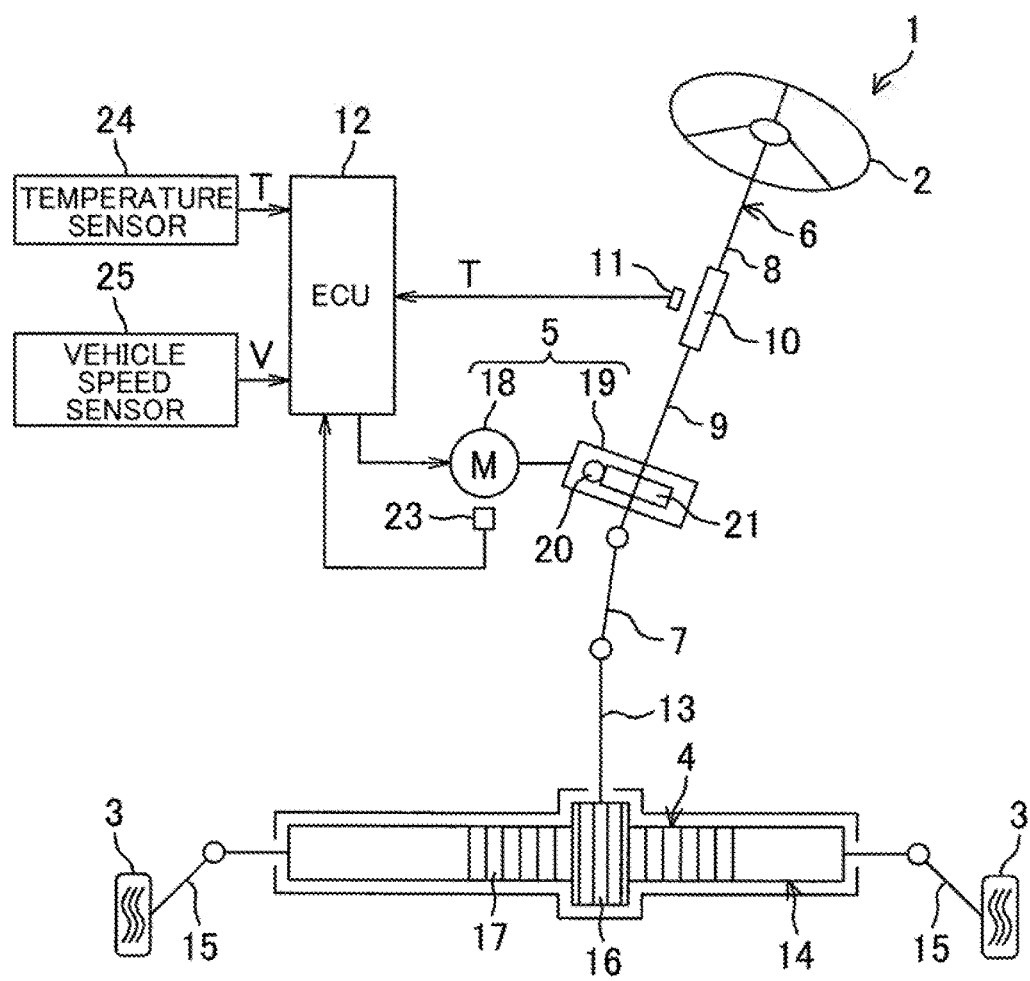
FIG. 1 is a schematic diagram illustrating the schematic configuration of an electric power steering system according to an embodiment of the invention.

Hereinafter, embodiments of the invention will be described in detail with reference to the accompanying drawings. FIG. 1 is a schematic diagram illustrating the schematic configuration of an electric power steering system according to an embodiment of the invention. An electric power steering system (EPS) 1 includes a steering wheel 2 serving as a steering member for steering a vehicle, a steering operation mechanism 4 configured to steer steered wheels 3 in response to the rotation of the steering wheel 2, and a steering assist mechanism 5 configured to assist a driver's steering operation. The steering wheel 2 and the steering operation mechanism 4 are mechanically coupled to each other via a steering shaft 6 and an intermediate shaft 7.

The steering shaft 6 includes an input shaft 8 coupled to the steering wheel 2, and an output shaft 9 coupled to the intermediate shaft 7. The input shaft 8 and the output shaft 9 are coupled to each other via a torsion bar 10 such that the input shaft 8 and the output shaft 9 are rotatable relative to each other. A torque sensor 11 is disposed near the torsion bar 10. The torque sensor 11 detects a steering torque Th applied to the steering wheel 2 based on a relative rotational displacement between the input shaft 8 and the output shaft 9. In the present embodiment, the steering torque Th is detected by the torque sensor 11 such that, for example, a torque for steering to the right is detected as a positive value and a torque for steering to the left is detected as a negative value. As an absolute value of the steering torque Th increases, a steering torque increases.

The steering operation mechanism 4 is a rack-and-pinion mechanism including a pinion shaft 13, and a rack shaft 14 serving as a steered shaft. The steered wheels 3 are coupled to respective ends of the rack shaft 14 via tie rods 15 and knuckle arms (not illustrated). The pinion shaft 13 is coupled to the intermediate shaft 7. The pinion shaft 13 is configured to rotate in response to a steering operation of the steering wheel 2. A pinion 16 is coupled to a distal end (a lower end in FIG. 1) of the pinion shaft 13.

The rack shaft 14 extends linearly along the lateral direction of the vehicle. A rack 17 to be engaged with the pinion 16 is provided in an intermediate portion of the rack shaft 14 in its axial direction. The pinion 16 and the rack 17 convert the rotation of the pinion shaft 13 into an axial movement of the rack shaft 14. Moving the rack shaft 14 in its axial direction allows the steered wheels 3 to be steered.

As the steering wheel 2 is steered (rotated), the rotation is transmitted to the pinion shaft 13 through the steering shaft 6 and the intermediate shaft 7. The rotation of the pinion shaft 13 is converted into an axial movement of the rack shaft 14 by the pinion 16 and the rack 17. This allows the steered wheels 3 to be steered. The steering assist mechanism 5 includes an electric motor 18 for steering assist, and a speed reducer 19 configured to transmit the torque output from the electric motor 18 to the steering operation mechanism 4. The electric motor 18 is a three-phase brushless motor including two sets of three-phase motor coils 18A, 18B (refer to FIG. 2). The electric motor 18 is driven by driving circuits 32, 34 (refer to FIG. 2) of two respective systems, as described later. The electric motor 18 is provided with a rotation angle sensor 23 configured to detect a rotation angle of a rotor of the electric motor 18. The rotation angle sensor 23 may be, for example, a resolver. The speed reducer 19 may be a worm gear mechanism including a worm shaft 20 and a worm wheel 21 to be engaged with the worm shaft 20.

The worm shaft 20 is rotationally driven by the electric motor 18. The worm wheel 21 is coupled to the steering shaft 6 such that the worm wheel 21 is rotatable together with the steering shaft 6 in an integrated manner. The worm wheel 21 is rotationally driven by the worm shaft 20. As the worm shaft 20 is rotationally driven by the electric motor 18, the worm wheel 21 is rotationally driven to rotate the steering shaft 6. Then, the rotation of the steering shaft 6 is transmitted to the pinion shaft 13 through the intermediate shaft 7. The rotation of the pinion shaft 13 is converted into an axial movement of the rack shaft 14. This allows the steered wheels 3 to be steered. That is, the steered wheels 3 are steered by rotationally driving the worm shaft 20 using the electric motor 18.

The vehicle is provided with a temperature sensor 24 configured to detect an ambient temperature T of the electric motor 18, and a vehicle speed sensor 25 configured to detect a vehicle speed V. An electronic control unit (ECU) 12 receives the temperature T detected by the temperature sensor 24, the vehicle speed V detected by the vehicle speed sensor 25, the steering torque Th detected by the torque sensor 11, an output signal from the rotation angle sensor 23, and so forth. The ECU 12 controls the electric motor 18 based on these input signals.

Figure 2:
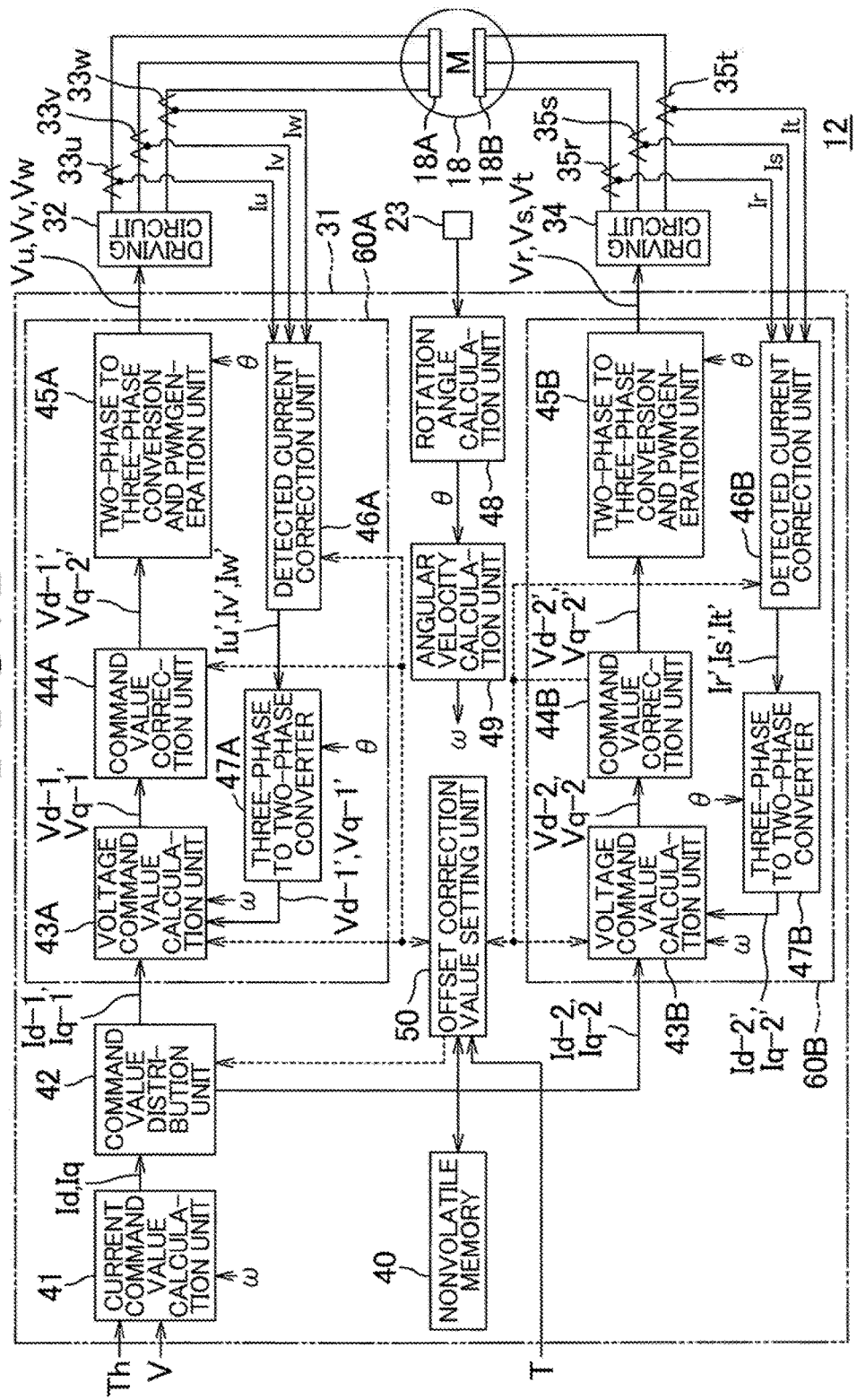
FIG. 2 is a block diagram illustrating the electrical configuration of an electronic control unit (ECU)

FIG. 2 is a block diagram illustrating the electrical configuration of the ECU 12. The electric motor 18 is provided with the two sets of three-phase motor coils 18A, 18B. The three-phase motor coil 18A will be referred to as a first motor coil 18A, and the three-phase motor coil 18B will be referred to as a second motor coil 18B. The first motor coil 18A includes a U-phase stator coil, a V-phase stator coil, and a W-phase stator coil. The second motor coil 18B includes an R-phase stator coil, an S-phase stator coil, and a T-phase stator coil. In the present embodiment, for example, the R-phase, the S-phase, and the T-phase are respectively identical to the U-phase, the V-phase, and the W-phase.

The ECU 12 includes a microcomputer 31, a first driving circuit (inverter) 32, and a second driving circuit (inverter) 34. The first driving circuit 32 is controlled by the microcomputer 31, so that electric power is supplied to the first motor coil 18A of the electric motor 18. The second driving circuit 34 is controlled by the microcomputer 31, so that electric power is supplied to the second motor coil 18B of the electric motor 18. The ECU 12 further includes current sensors $33u$, $33v$, $33w$ configured to respectively detect a U-phase current Iu, a V-phase current Iv, and a W-phase current Iw flowing through the U-phase stator coil, the V-phase stator coil, and the W-phase stator coil of the first motor coil 18A. The ECU 12 further includes current sensors $35r$, $35s$, $35t$ configured to respectively detect an R-phase current Ir, an S-phase current Is, and a T-phase current It flowing through the R-phase stator coil, the S-phase stator coil, and the T-phase stator coil of the second motor coil 18B.

The microcomputer 31 includes a central processing unit (CPU) and memories (e.g. a read-only memory (ROM), a random-access memory (RAM), and a nonvolatile memory 40). The microcomputer 31 is configured to serve as a plurality of function processing units by executing prescribed programs. The function processing units include a current command value calculation unit 41, a command value distribution unit 42, a first control unit 60A configured to control driving of the first driving circuit 32, a second control unit 60B configured to control driving of the second driving circuit 34, a rotation angle calculation unit 48, an angular velocity calculation unit 49, and an offset correction value setting unit 50. The first control unit 60A includes a first voltage command value calculation unit 43A, a first command value correction unit 44A, a first two-phase to three-phase conversion and PWM generation unit 45A, a first detected current correction unit 46A, and a first three-phase to two-phase converter 47A. The second control unit 60B includes a second voltage command value calculation unit 43B, a second command value correction unit 44B, a second two-phase to three-phase conversion and PWM generation unit 45B, a second detected current correction unit 46B, and a second three-phase to two-phase converter 47B.

The rotation angle calculation unit 48 calculates a rotation angle θ (electrical angle) of the rotor (hereinafter, referred to as "rotor rotation angle θ" where appropriate) of the electric motor 18 based on an output signal from the rotation angle sensor 23. The rotor rotation angle θ calculated by the rotation angle calculation unit 48 is provided to the first and second two-phase to three-phase conversion and PWM generation units 45A, 45B, and the first and second three-phase to two-phase converter 47A, 47B. The angular velocity calculation unit 49 calculates an angular velocity co of the electric motor 18 by subjecting the rotation angle θ calculated by the rotation angle calculation unit 48 to temporal differentiation. The angular velocity ω calculated by the angular velocity calculation unit 49 is provided to the current command value calculation unit 41 and the first and second voltage command value calculation units 43A, 43B.

The current command value calculation unit 41 sets, as a current command value (basic current command value), a value of a current to be passed through a coordinate axis of a dq-coordinate system, based on the steering torque Th detected by the torque sensor 11, the vehicle speed V detected by the vehicle speed sensor 25, and the angular velocity ω of the electric motor 18 calculated by the angular velocity calculation unit 49. Specifically, the current command value calculation unit 41 calculates a d-axis current command value Id and a q-axis current command value Iq (hereinafter, collectively referred to as a two-phase current command value Idq where appropriate).

The current command value calculation unit 41 calculates a target torque Tm by multiplying a steering torque Th by a vehicle speed gain Gv (Gv>0) corresponding to the vehicle speed V. The vehicle speed gain Gv takes a smaller value as, for example, the vehicle speed V increases. Thus, as an absolute value of the steering torque Th increases, an absolute value of the target torque Tm increases, and as the vehicle speed V increases, an absolute value of the target torque Tm decreases. Next, the current command value calculation unit 41 calculates the q-axis current command value Iq by dividing the target torque Tm by a torque constant Kt of the electric motor 18. Subsequently, the current command value calculation unit 41 calculates a d-axis current command value Id corresponding to the angular velocity ω based on a map storing the relationship between the angular velocity of the electric motor and a d-axis current command value, and the angular velocity ω of the electric motor 18 calculated by the angular velocity calculation unit 49. So-called field-weakening control is executed based on the d-axis current command value Id. The two-phase current command value Idq calculated by the current command value calculation unit 41 is provided to the command value distribution unit 42.

The command value distribution unit 42 distributes the two-phase current command value Idq to the first control unit 60A and the second control unit 60B. In the present embodiment, at normal times, the command value distribution unit 42 distributes half of the two-phase current command value Idq to each of the first control unit 60A and the second control unit 60B. That is, at normal times, each of a distribution factor of the two-phase current command value Idq for the first control unit 60A and a distribution factor of the two-phase current command value Idq for the second control unit 60B is 50%. The two-phase current command value to be distributed to the first control unit 60A will be referred to as a first two-phase current command value Idq_1. The first two-phase current command value Idq_1 includes a first d-axis current command value Id_1, and a first q-axis current command value Iq_1. The two-phase current command value to be distributed to the second control unit 60B will be referred to as a second two-phase current command value Idq_2. The second two-phase current command value Idq_2 includes a second d-axis current command value Id_2, and a second q-axis current command value Iq_2.

First, the first control unit 60A will be described. The first detected current correction unit 46A applies offset correction to a U-phase detected current Iu, a V-phase detected current Iv, and a W-phase detected current Iw (three-phase detected currents Iu, Iv, Iw of a UVW-coordinate system) detected by the current sensors 33u, 33v, 33w, respectively. Specifically, the first detected current correction unit 46A corrects the U-phase detected current Iu, the V-phase detected current Iv, and the W-phase detected current Iw, according to Expressions (1), (2), (3), respectively.

$$Iu'=Iu-\beta u \qquad \text{Expression (1)}$$

$$Iv'=Iv-\beta v \qquad \text{Expression (2)}$$

$$Iw'=Iw-\beta w \qquad \text{Expression (3)}$$

In Expressions (1), (2), (3), βu, βv and βw are offset correction values respectively applied to the U-phase detected current Iu, the V-phase detected current Iv, and the W-phase detected current Iw. The offset correction values βu, βv, βw are set by the offset correction value setting unit 50.

The U-phase detected current Iu', the V-phase detected current Iv', and the W-phase detected current Iw' after the offset correction are provided to the first three-phase to two-phase converter 47A. The first three-phase to two-phase converter 47A executes coordinate transformation to convert the U-phase detected current Iu', the V-phase detected current Iv', and the W-phase detected current Iw' after the offset correction, into a d-axis detected current Id_1' and a q-axis detected current Iq_1', which are two-phase detected currents of the dq-coordinate system. The coordinate transformation is executed based on the rotor rotation angle θ calculated by the rotation angle calculation unit 48.

At normal times, the first voltage command value calculation unit 43A calculates a first d-axis voltage command value Vd_1 and a first q-axis voltage command value Vq_1 (first two-phase voltage command value) based on the first d-axis current command value Id_1 and the first q-axis current command value Iq_1, which are distributed to the first control unit 60A, and the d-axis detected current Id_1' and the q-axis detected current Iq_1', which are calculated by the first three-phase to two-phase converter 47A.

Specifically, the first voltage command value calculation unit 43A first corrects the first d-axis current command value Id_1 and the first q-axis current command value Iq_1. The first d-axis current command value Id_1 and the first q-axis current command value Iq_1 after the correction are respectively expressed by Expressions (4), (5).

$$d\text{-axis current command value after correction}=d\text{-axis current command value after immediately preceding correction}+(Id\_1-Id\_1') \qquad \text{Expression (4)}$$

$$q\text{-axis current command value after correction}=q\text{-axis current command value after immediately preceding correction}+(Iq\_1-Iq\_1') \qquad \text{Expression (5)}$$

An initial value of each of the d-axis current command value after the immediately preceding correction and the q-axis current command value after the immediately preceding correction is, for example, zero.

Next, the first voltage command value calculation unit 43A defines, as Id_1, the d-axis current command value after the correction, which is acquired according to Expression (4). In addition, the first voltage command value calculation unit 43A defines, as Iq_1, the q-axis current command value after correction, which is acquired according to Expression (5). The first voltage command value calculation unit 43A then calculates the first d-axis voltage command value Vd_1 and the first q-axis voltage command value Vq_1, according to Expressions (6), (7), respectively.

$$Vd\_1 = r1 \cdot Id\_1 - \omega \cdot Lq \cdot Iq\_1 \quad \text{Expression (6)}$$

$$Vq\_1 = r1 \cdot Iq\_1 + \omega \cdot Ld \cdot Id\_1 + \omega \cdot \phi m \quad \text{Expression (7)}$$

In Expressions (6), (7), ω is an angular velocity of the electric motor 18 calculated by the angular velocity calculation unit 49, r1 is a resistance of the first motor coil 18A, Ld is a d-axis inductance of the electric motor 18, Lq is a q-axis inductance of the electric motor 18, and φm is a magnetic flux of a permanent magnet. Each of r1, Lq, Ld, and φm is set in advance.

At normal times, the first command value correction unit 44A provides, to the first two-phase to three-phase conversion and PWM generation unit 45A, the first d-axis voltage command value Vd_1 and the first q-axis voltage command value Vq_1, which are calculated by the first voltage command value calculation unit 43A, as a first d-axis voltage command value Vd_1' and a first q-axis voltage command value Vq_1' after the correction, without making any changes in the first d-axis voltage command value Vd_1 and the first q-axis voltage command value Vq_1. The first two-phase to three-phase conversion and PWM generation unit 45A first executes coordinate transformation to convert the first d-axis voltage command value Vd_1' and the first q-axis voltage command value Vq_1', which are provided from the first command value correction unit 44A, into a three-phase voltage command value Vuvw. The coordinate transformation is executed based on the rotor rotation angle θ calculated by the rotation angle calculation unit 48. The three-phase voltage command value Vuvw includes a U-phase voltage command value Vu, a V-phase voltage command value Vv, and a W-phase voltage command value Vw. Then, the first two-phase to three-phase conversion and PWM generation unit 45A generates a U-phase PWM signal, a V-phase PWM signal, and a W-phase PWM signal that respectively have duty ratios corresponding to the U-phase voltage command value Vu, the V-phase voltage command value Vv, and the W-phase voltage command value Vw, and then provides the signals to the first driving circuit 32.

The first driving circuit 32 is an inverter circuit with three phases corresponding to a U-phase, a V-phase, and a W-phase. A voltage corresponding to the three-phase voltage command value Vuvw is applied to a stator coil of each phase of the first motor coil 18A of the electric motor 18, by controlling power elements constituting the inverter circuit according to PWM signals provided from the first two-phase to three-phase conversion and PWM generation unit 45A. Thus, a motor current flowing through the first motor coil 18A is controlled so as to approach the first current command value Idq_1 distributed to the first control unit 60A by the command value distribution unit 42.

Subsequently, the second control unit 60B will be described. The second detected current correction unit 46B applies offset correction to an R-phase detected current Ir, an S-phase detected current Is, and a T-phase detected current It (three-phase detected currents Ir, Is, and It of an RST-coordinate system), which are detected by the current sensors 35r, 35s, 35t. Specifically, the second detected current correction unit 46B corrects the R-phase detected current Ir, the S-phase detected current Is, and the T-phase detected current It according to Expressions (8), (9), (10), respectively.

$$Ir' = Ir - \beta r \quad \text{Expression (8)}$$

$$Is' = Is - \beta s \quad \text{Expression (9)}$$

$$It' = It - \beta t \quad \text{Expression (10)}$$

In Expressions (8), (9), (10), βr, βs, and βt are offset correction values respectively applied to the R-phase detected current Ir, the S-phase detected current Is, and the T-phase detected current It. The offset correction values βr, βs, βt are set by the offset correction value setting unit 50.

The R-phase detected current Ir', the S-phase detected current Is' and the T-phase detected current It' after the offset correction are provided to the second three-phase to two-phase converter 47B. The second three-phase to two-phase converter 47B executes coordinate transformation to convert the R-phase detected current Ir', the S-phase detected current Is', and the T-phase detected current It' after the offset correction, into a d-axis detected current Id_2' and a q-axis detected current Iq_2', which are two-phase detected currents of the dq-coordinate system. The coordinate transformation is executed based on the rotor rotation angle θ calculated by the rotation angle calculation unit 48.

At normal times, the second voltage command value calculation unit 43B calculates a second d-axis voltage command value Vd_2 and a second q-axis voltage command value Vq_2 (second two-phase voltage command value) based on the second d-axis current command value Id_2 and the second q-axis current command value Iq_2, which are distributed to the second control unit 60B, and the d-axis detected current Id_2' and the q-axis detected current Iq_2', which are calculated by the second three-phase to two-phase converter 47B.

Specifically, the second voltage command value calculation unit 43B first corrects the second d-axis current command value Id_2 and the second q-axis current command value Iq_2. The second d-axis current command value Id_2 and the second q-axis current command value Iq_2 after the correction are expressed by Expressions (11), (12), respectively.

$$\begin{aligned}&d\text{-axis current command value after correction} = d\text{-}\\&\quad\text{axis current command value after immediately}\\&\quad\text{preceding correction} + (Id\_2 - Id\_2')\end{aligned} \quad \text{Expression (11)}$$

$$\begin{aligned}&q\text{-axis current command value after correction} = q\text{-}\\&\quad\text{axis current command value after immediately}\\&\quad\text{preceding correction} + (Iq\_2 - Iq\_2')\end{aligned} \quad \text{Expression (12)}$$

An initial value of each of the d-axis current command value after the immediately preceding correction and the q-axis current command value after the immediately preceding correction is, for example, zero.

Next, the second voltage command value calculation unit 43B defines, as Id_2, the d-axis current command value after the correction, which is acquired according to Expression (11). In addition, the second voltage command value calculation unit 43B defines, as Iq_2, the q-axis current command value after the correction, which is acquired according to Expression (12). The second voltage command value calculation unit 43B then calculates the second d-axis voltage command value Vd_2 and the second q-axis voltage command value Vq_2 according to Expressions (13), (14), respectively.

$$Vd\_2 = r2 \cdot Id\_2 - \omega \cdot Lq \cdot Iq\_2 \qquad \text{Expression (13)}$$

$$Vq\_2 = r2 \cdot Iq\_2 + \omega \cdot Ld \cdot Id\_2 + \omega \cdot \phi m \qquad \text{Expression (14)}$$

In Expressions (13), (14), ω is an angular velocity of the electric motor 18 calculated by the angular velocity calculation unit 49, r2 is a resistance of the second motor coil 18B, Ld is a d-axis inductance of the electric motor 18, Lq is a q-axis inductance of the electric motor 18, and φm is a magnetic flux of a permanent magnet. Each of r2, Lq, Ld, and φm, is set in advance.

At normal times, the second command value correction unit 44B provides, to the second two-phase to three-phase conversion and PWM generation unit 45B, the second d-axis voltage command value Vd_2 and the second q-axis voltage command value Vq_2, which are calculated by the second voltage command value calculation unit 43B, as a second d-axis voltage command value Vd_2' and a second q-axis voltage command value Vq_2' after the correction, without making any changes in the second d-axis voltage command value Vd_2 and the second q-axis voltage command value Vq_2. The second two-phase to three-phase conversion and PWM generation unit 45B first executes coordinate transformation to convert the second d-axis voltage command value Vd_2' and the second q-axis voltage command value Vq_2', which are provided from the second command value correction unit 44B, into a three-phase voltage command value Vrst. The coordinate transformation is executed based on the rotor rotation angle θ calculated by the rotation angle calculation unit 48. The three-phase voltage command value Vrst includes an R-phase voltage command value Vr, an S-phase voltage command value Vs, and a T-phase voltage command value Vt. Then, the second two-phase to three-phase conversion and PWM generation unit 45B generates an R-phase PWM signal, an S-phase PWM signal, and a T-phase PWM signal that respectively have duty ratios corresponding to the R-phase voltage command value Vr, the S-phase voltage command value Vs, and the T-phase voltage command value Vt, and then provides the signals to the second driving circuit 34.

The second driving circuit 34 is an inverter circuit with three phases corresponding to a U-phase, a V-phase, and a W-phase. A voltage corresponding to the three-phase voltage command value Vrst is applied to a stator coil of each phase of the second motor coil 18B of the electric motor 18, by controlling power elements constituting the inverter circuit according to PWM signals provided from the second two-phase to three-phase conversion and PWM generation unit 45B. Thus, a motor current flowing through the second motor coil 18B is controlled so as to approach the second current command value Idq_2 distributed to the second control unit 60B by the command value distribution unit 42.

Subsequently, the offset correction value setting unit 50 will be described. The characteristics of each of the current sensors 33u, 33v, 33w, 35r, 35s, 35t vary as, for example, the temperature conditions vary. Thus, the offset correction values βu, βv, βw, βr, βs, βt for respectively correcting the detected values Iu, Iv, Iw, Ir, Is, It from the current sensors 33u, 33v, 33w, 35r, 35s, 35t, need to be corrected (updated) based on, for example, the temperature conditions. The offset correction value setting unit 50 corrects the offset correction values βu, βv, βw, βr, βs, βt at substantially regular intervals.

The first two-phase voltage command values Vd_1, Vq_1, at which the three-phase detected currents Iu, Iv, Iw are zero at a reference temperature (e.g. 25° C.) when the electric motor 18 is not rotating, are acquired in advance and stored in the nonvolatile memory 40, as ΔVd_1, ΔVq_1, respectively. Likewise, the second two-phase voltage command values Vd_2, Vq_2, at which the three-phase detected currents Ir, Is, It are zero at the reference temperature when the electric motor 18 is not rotating, are acquired in advance and stored in the nonvolatile memory 40, as ΔVd_2, ΔVq_2, respectively.

In addition, the offset correction values βu, βv, βw for the three-phase detected currents Iu, Iv, Iw at the reference temperature are acquired in advance, and stored in the nonvolatile memory 40 as reference offset correction values βuo, βvo, βwo, respectively. Likewise, the offset correction values βr, βs, βt for the three-phase detected currents Ir, Is, It at the reference temperature are acquired in advance, and stored in the nonvolatile memory 40 as reference offset correction values βro, βso, βto, respectively.

Figure 3:
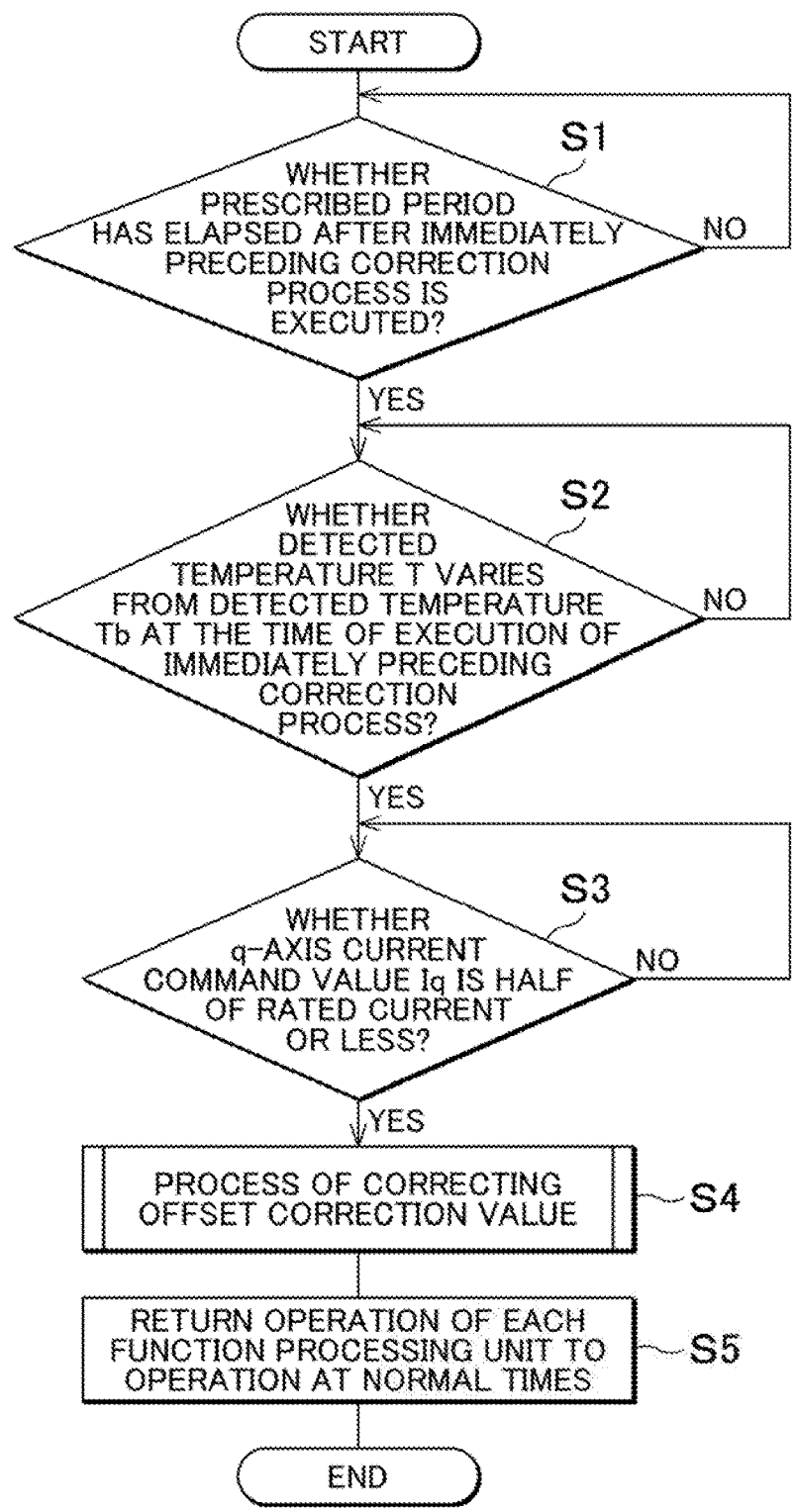
FIG. 3 is a flowchart for describing an operation of an offset correction value setting unit.

FIG. 3 is a flowchart for describing an operation of the offset correction value setting unit 50. The offset correction value setting unit 50 determines whether a prescribed period has elapsed after an immediately preceding process of correcting an offset correction value (a process in step S4, described later) is executed (step S1). When the prescribed period has not elapsed after the immediately preceding process of correcting the offset correction value is executed (NO in step S1), the offset correction value setting unit 50 returns to step S1.

When the offset correction value setting unit 50 determines that the prescribed period has elapsed after the immediately preceding process of correcting the offset correction value is executed (YES in step S1), the offset correction value setting unit 50 proceeds to step S2. The offset correction value setting unit 50 determines in step S2 whether the presently detected temperature T detected by the temperature sensor 24 has varied from a detected temperature Tb at the time of execution of the immediately preceding process of correcting the offset correction value (hereinafter, referred to as "detected temperature Tb at the time of execution of the immediately preceding correction process"). The detected temperature Tb at the time of execution of the immediately preceding correction process is stored in the nonvolatile memory 40 (refer to step S11 in FIG. 4 described later).

When the offset correction value setting unit 50 determines that the presently detected temperature T has not varied from the detected temperature Tb at the time of execution of the immediately preceding correction process (NO in step S2), the offset correction value setting unit 50 returns to step S2. When the offset correction value setting unit 50 determines that the presently detected temperature T has varied from the detected temperature Tb at the time of execution of the immediately preceding correction process (YES in step S2), the offset correction value setting unit 50 determines whether the q-axis current command value Iq calculated by the current command value calculation unit 41 is half of a rated current or less (step S3). The rated current means an amount of current that can be output from the inverters of the two respective systems (driving circuits of the two respective systems). When the q-axis current command value Iq is greater than half of the rated current (NO in step S3), the offset correction value setting unit 50 returns to step S3. When the maximum torque required by the steering system can be output from only the inverter of one system, step S3 may be omitted.

When the offset correction value setting unit 50 determines in step S3 that the q-axis current command value Iq is half of the rated current or less (YES in step S3), the offset correction value setting unit 50 proceeds to step S4 to execute the process of correcting the offset correction value.

Details of the process of correcting the offset correction value will be described below. When the process of correcting the offset correction value in step S4 ends, the offset correction value setting unit 50 returns an operation of each of the function processing units in the microcomputer 31 to an operation at normal times (step S5), and then ends the present routine.

Figure 4:
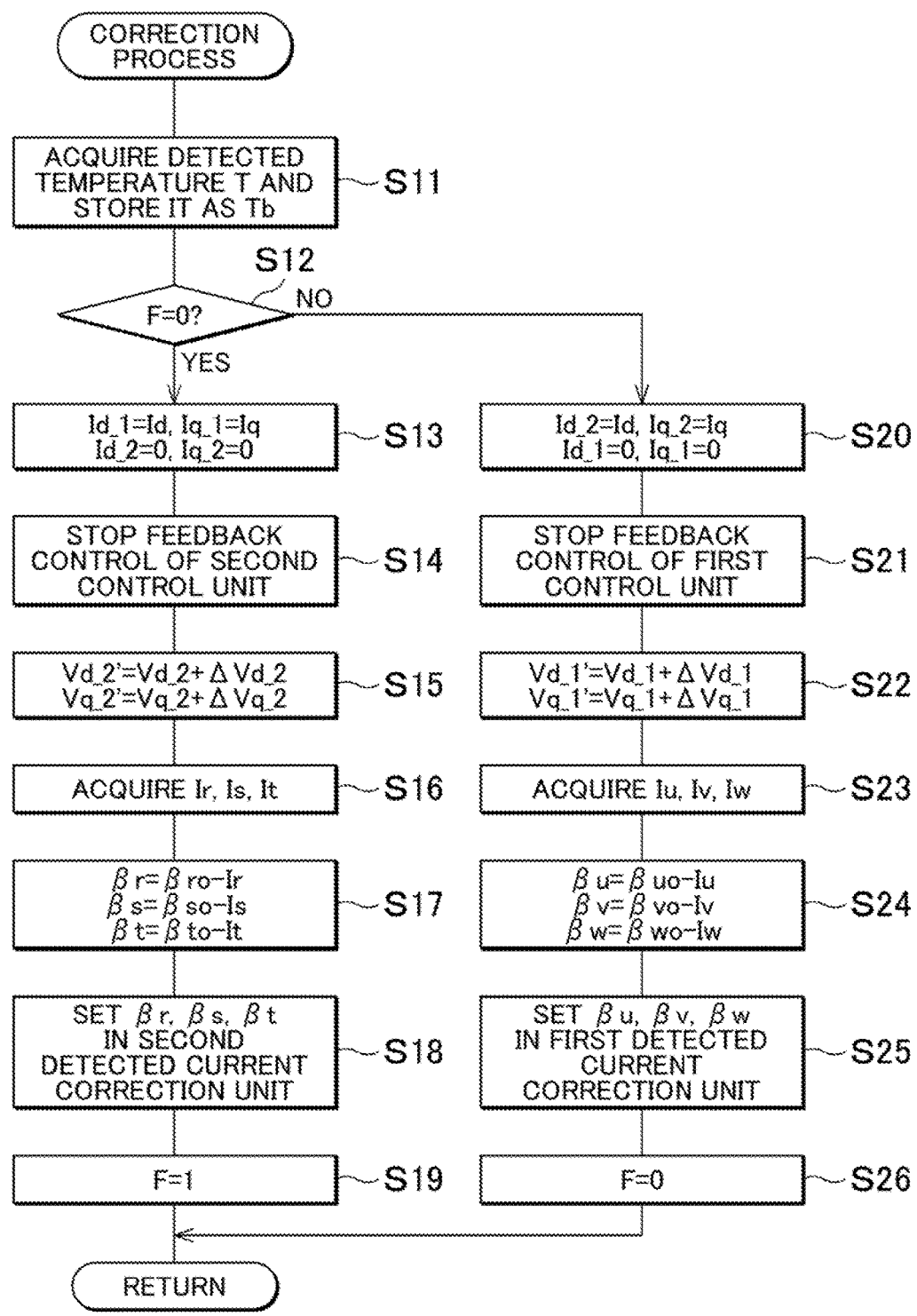
FIG. 4 is a flowchart illustrating a detailed procedure of a process in step S4 in FIG. 3.

FIG. 4 is a flowchart illustrating the detailed procedure of the process (process of correcting an offset correction value) in step S4 in FIG. 3. The offset correction value setting unit 50 acquires the temperature T detected by the temperature sensor 24, and stores the temperature T in the nonvolatile memory 40, as an immediately preceding detected temperature Tb (step S11). Subsequently, the offset correction value setting unit 50 determines whether a corrected value determination flag F has been reset (F=0) (step S12). The corrected value determination flag F is used to store the information as to whether the offset correction values corrected in the immediately preceding correction process are the offset correction values βu, βv, βw of the first control unit 60A, or the offset correction values βr, βs, βt of the second control unit 60B. As described later, when the offset correction values βr, βs, βt of the second control unit 60B are corrected in the correction process, the corrected value determination flag F is set (F=1) (refer to step S19), whereas when the offset correction values βu, βv, βw of the first control unit 60A are corrected in the correction process, the corrected value determination flag F is reset (F=0) (refer to step S26). The corrected value determination flag F has an initial value of zero.

When the corrected value determination flag F has been reset (F=0) (YES in step S12), the offset correction value setting unit 50 controls the command value distribution unit 42 such that the distribution factor of the two-phase current command value Idq for the first control unit 60A is 100%, and the distribution factor of the two-phase current command value Idq for the second control unit 60B is 0% (step S13). Thus, the command value distribution unit 42 sets the two-phase current command values Id, Iq calculated by the current command value calculation unit 41 as the two-phase current command values Id_1, Iq_1 to be distributed to the first control unit 60A, and sets the two-phase current command values Iq_2, Id_2 to be distributed to the second control unit 60B to zero.

Subsequently, the offset correction value setting unit 50 stops the feedback control of the second control unit 60B (step S14). That is, the offset correction value setting unit 50 stops the current feedback to the second voltage command value calculation unit 43B. Thus, the second voltage command value calculation unit 43B calculates the two-phase voltage command values Vd_2, Vq_2 according to Expressions (15), (16).

$$Vd\_2 = r2 \cdot Id\_2 - \omega \cdot Lq \cdot Iq\_2 \quad \text{Expression (15)}$$

$$Vq\_2 = r2 \cdot Iq\_2 + \omega \cdot Ld \cdot Id\_2 + \omega \cdot \phi m \quad \text{Expression (16)},$$

In Expressions (15), (16), Iq_2, Id_2 refer respectively to the two-phase current command values Iq_2, Id_2 provided to the second voltage command value calculation unit 43B from the command value distribution unit 42 (Iq_2=Id_2=0 in this case).

Because Id_2, Iq_2 are each zero, each of the two-phase voltage command values Vd_2 (=0), Vq_2 (=ω·φm) calculated according to Expressions (15), (16) is a two-phase voltage command value with which a current to be passed through the second motor coil 18B due to a counter electromotive force is cancelled out. Subsequently, the offset correction value setting unit 50 provides an instruction of correcting the two-phase voltage command values, to the second command value correction unit 44B (step S15). Thus, the second command value correction unit 44B corrects the two-phase voltage command values Vd_2, Vq_2 calculated by the second voltage command value calculation unit 43B according to Expressions (17), (18).

$$Vd\_2' = Vd\_2 + \Delta Vd\_2 \quad \text{Expression (17)}$$

$$Vq\_2' = Vq\_2 + \Delta Vq\_2 \quad \text{Expression (18)}$$

ΔVd_2, ΔVq_2 are respectively the two-phase voltage command values Vd_2, Vq_2 at which the three-phase detected currents Ir, Is, It are zero at the reference temperature when the electric motor 18 is not rotating.

The two-phase voltage command values Vd_2', Vq_2' after the correction are provided to the second two-phase to three-phase conversion and PWM generation unit 45B, and converted into the three-phase voltage command values Vr, Vs, Vt through coordinate transformation, and then an R-phase PWM signal, an S-phase PWM signal, and a T-phase PWM signal that respectively have duty ratios corresponding to the three-phase voltage command values Vr, Vs, Vt, are generated. Then, the PWM signals are provided to the second driving circuit 34. The two-phase voltage command values Vd_2', Vq_2' after the correction, which are calculated according to Expressions (17), (18), are acquired by adding the two-phase voltage command values ΔVd_2, ΔVq_2, at which the three-phase detected currents Ir, Is, It are zero at the reference temperature when the electric motor 18 is not rotating, to the two-phase voltage command values Vd_2, Vq_2 with which a current to be passed through the second motor coil 18B due to a counter electromotive force is cancelled out. Thus, when the present temperature is the reference temperature, the two-phase voltage command value Vd_2', Vq_2' after the correction are supposed to correspond to two-phase voltage command values at which the three-phase detected currents Ir, Is, It are zero in a present state where the electric motor 18 is rotating at the angular velocity ω.

The offset correction value setting unit 50 then acquires the three-phase detected currents Ir, Is, It detected by the current sensors 35r, 35s, 35t, respectively (step S16). It is considered that the acquired three-phase detected currents Ir, Is, It respectively correspond to errors with respect to the offset correction values βro, βso, βto at the reference temperature, due to a temperature difference from the reference temperature. Thus, the offset correction value setting unit 50 corrects the offset correction values βr, βs, βt, according to Expressions (19), (20), (21), respectively (step S17).

$$\beta r = \beta ro - Ir \quad \text{Expression (19)}$$

$$\beta s = \beta so - Is \quad \text{Expression (20)}$$

$$\beta t = \beta to - It \quad \text{Expression (21)}$$

Then, the offset correction value setting unit 50 sets the offset correction values βr, βs, βt after the correction, in the second detected current correction unit 46B as the offset correction values βr, βs, βt (step S18).

Subsequently, the offset correction value setting unit 50 sets the corrected value determination flag F (F=1) (step S19), and then proceeds to step S5 in FIG. 3. When the corrected value determination flag F is set (F=1) in step S12 (NO in step S12), the offset correction value setting unit 50 controls the command value distribution unit 42 such that the distribution factor of the two-phase current command value Idq for the second control unit 60B is 100%, and the distribution factor of the two-phase current command value Idq for the first control unit 60A is 0% (step S20). Thus, the command value distribution unit 42 sets the two-phase current command values Iq, Id calculated by the current command value calculation unit 41 respectively as the two-phase current command values Iq_2, Id_2 to be distributed to the second control unit 60B, and sets the two-phase current command values Iq_1, Id_1 to be distributed to the first control unit 60A to zero.

Subsequently, the offset correction value setting unit 50 stops the feedback control of the first control unit 60A (step S21). That is, the offset correction value setting unit 50 stops the current feedback to the first voltage command value calculation unit 43A. Thus, the first voltage command value calculation unit 43A calculates the two-phase voltage command values Vd_1, Vq_1 according to Expressions (22), (23).

$$Vd\_1 = r1 \cdot Id\_1 - \omega \cdot Lq \cdot Iq\_1 \qquad \text{Expression (22)}$$

$$Vq\_1 = r1 \cdot Iq\_1 + \omega \cdot Ld \cdot Id\_1 + \omega \cdot \phi m \qquad \text{Expression (23)},$$

In Expressions (22), (23), Iq_1, Id_1 refer respectively to the two-phase current command values Iq_1, Id_1 provided to the first voltage command value calculation unit 43A from the command value distribution unit 42 (Iq_1=Id_1=0 in this case).

Because Id_1, Iq_1 are each zero, each of the two-phase voltage command values Vd_1 (=0), Vq_1 (=ω·φm) calculated according to Expressions (22), (23) is a two-phase voltage command value at which a current to be passed through the first motor coil 18A due to a counter electromotive force is cancelled out. Subsequently, the offset correction value setting unit 50 provides an instruction of correcting the two-phase voltage command values, to the first command value correction unit 44A (step S22). Thus, the first command value correction unit 44A corrects the two-phase voltage command values Vd_1, Vq_1 calculated by the first voltage command value calculation unit 43A according to Expressions (24), (25).

$$Vd\_1' = Vd\_1 + \Delta Vd\_1 \qquad \text{Expression (24)}$$

$$Vq\_1' = Vq\_1 + \Delta Vq\_1 \qquad \text{Expression (25)}$$

ΔVd_1, ΔVq_1 are respectively the two-phase voltage command values Vd_1, Vq_1 at which the three-phase detected currents Iu, Iv, Iw are zero at the reference temperature when the electric motor 18 is not rotating.

The two-phase voltage command values Vd_1', Vq_1' after the correction are provided to the first two-phase to three-phase conversion and PWM generation unit 45A, and converted into the three-phase voltage command values Vu, Vv, Vw through coordinate transformation, and then a U-phase PWM signal, a V-phase PWM signal, and a W-phase PWM signal that respectively have duty ratios corresponding to the three-phase voltage command values Vu, Vv, Vw, are generated. Then, the PWM signals are provided to the first driving circuit 32. The two-phase voltage command values Vd_1', Vq_1' after the correction, which are calculated according to Expressions (24), (25), are acquired by adding the two-phase voltage command values ΔVd_1, ΔVq_1 at which the three-phase detected currents Iu, Iv, Iw are zero at the reference temperature when the electric motor 18 is not rotating, to the two-phase voltage command values Vd_1, Vq_1 with which a current to be passed through the first motor coil 18A due to a counter electromotive force is cancelled out. Thus, when the present temperature is the reference temperature, the two-phase voltage command value Vd_1', Vq_1' after the correction are supposed to correspond to the two-phase voltage command values at which the three-phase detected currents Iu, Iv, Iw are zero in a present state where the electric motor 18 is rotating at the angular velocity ω.

The offset correction value setting unit 50 then acquires the three-phase detected currents Iu, Iv, Iw detected by the current sensors 33*u*, 33*v*, 33*w*, respectively (step S23). It is considered that the acquired three-phase detected currents Iu, Iv, Iw respectively correspond to errors with respect to the offset correction values βuo, βvo, βwo at the reference temperature, due to a temperature difference from the reference temperature. Thus, the offset correction value setting unit 50 corrects the offset correction values βu, βv, βw, according to Expressions (26), (27), (28), respectively (step S24).

$$\mu u = \beta uo - Iu \qquad \text{Expression (26)}$$

$$\beta v = \beta vo - Iv \qquad \text{Expression (27)}$$

$$\beta w = \beta wo - Iw \qquad \text{Expression (28)}$$

Then, the offset correction value setting unit 50 sets the offset correction values βu, βv, βw after the correction, in the first detected current correction unit 46A as the offset correction values βu, βv, βw (step S25).

Subsequently, the offset correction value setting unit 50 resets the corrected value determination flag F (F=0) (step S26), and then proceeds to step S5 in FIG. 3. In the flowchart in FIG. 3, the process in step S2 may be omitted. In this case, the process in step S11 in FIG. 4 is also omitted. According to the embodiment described above, the offset correction values βu, βv, βw and the offset correction values βr, βs, βt can be corrected without stopping the operation of the electric power steering system 1. Thus, the offset correction values βu, βv, βw and the offset correction values βr, βs, βt can be corrected at substantially regular intervals, and thus errors of the detected currents Iu, Iv, Iw, Ir, Is, it due to temperature can be effectively reduced.

Figure 5:
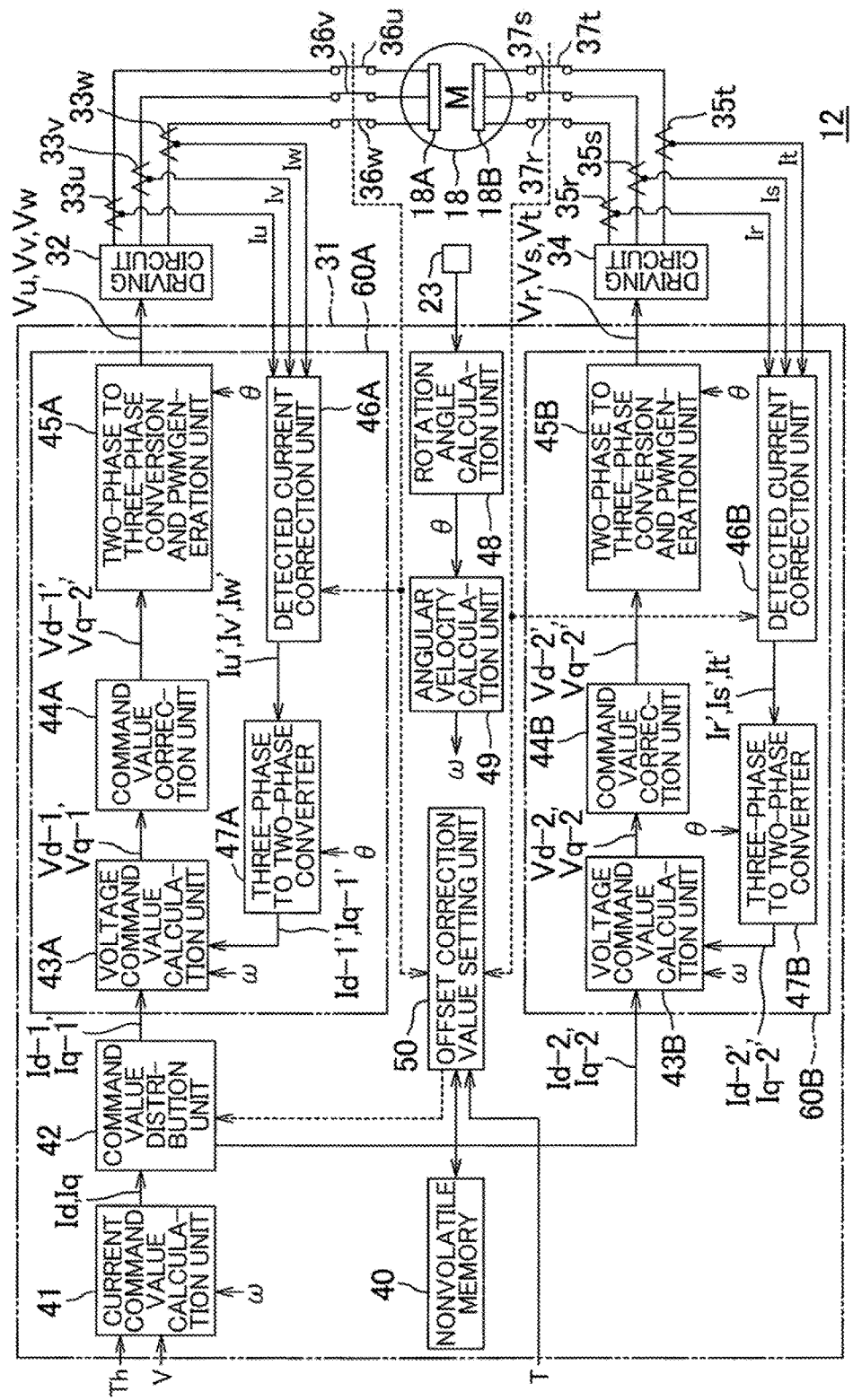
FIG. 5 is a block diagram illustrating another example of the electrical configuration of the ECU.

FIG. 5 is a block diagram illustrating another example of the electrical configuration of the ECU 12. In FIG. 5, the elements corresponding to those in FIG. 2 are denoted by the same reference symbols as those in FIG. 2. In the configuration in FIG. 5, first relays 36*u*, 36*v*, 36*w* (first switches) are provided on power supply paths (connecting lines) for supplying electric power to the first motor coil 18A from the first driving circuit 32. Likewise, second relays 37*r*, 37*s*, 37*t* (second switches) are provided on power supply paths (connecting lines) for supplying electric power to the second motor coil 18B from the second driving circuit 34. The relays 36*u*, 36*v*, 36*w*, 37*r*, 37*s*, 37*t* are in an on-state (closed-state) at normal times.

The operation of the current command value calculation unit 41 and the operation of the command value distribution unit 42 in FIG. 5 are respectively identical to the operation of the current command value calculation unit 41 and the operation of the command value distribution unit 42 in FIG. 2. The operation of the first control unit 60A and the operation of the second control unit 60B in FIG. 5 at normal times are identical to the operation of the first control unit 60A and the operation of the second control unit 60B in FIG. 2 at normal times. Because the operation of the offset correction value setting unit 50 in FIG. 5 is different from the operation of the offset correction value setting unit 50 in FIG. 2, the operation of the offset correction value setting unit 50 in FIG. 5 will be described below.

Figure 6:
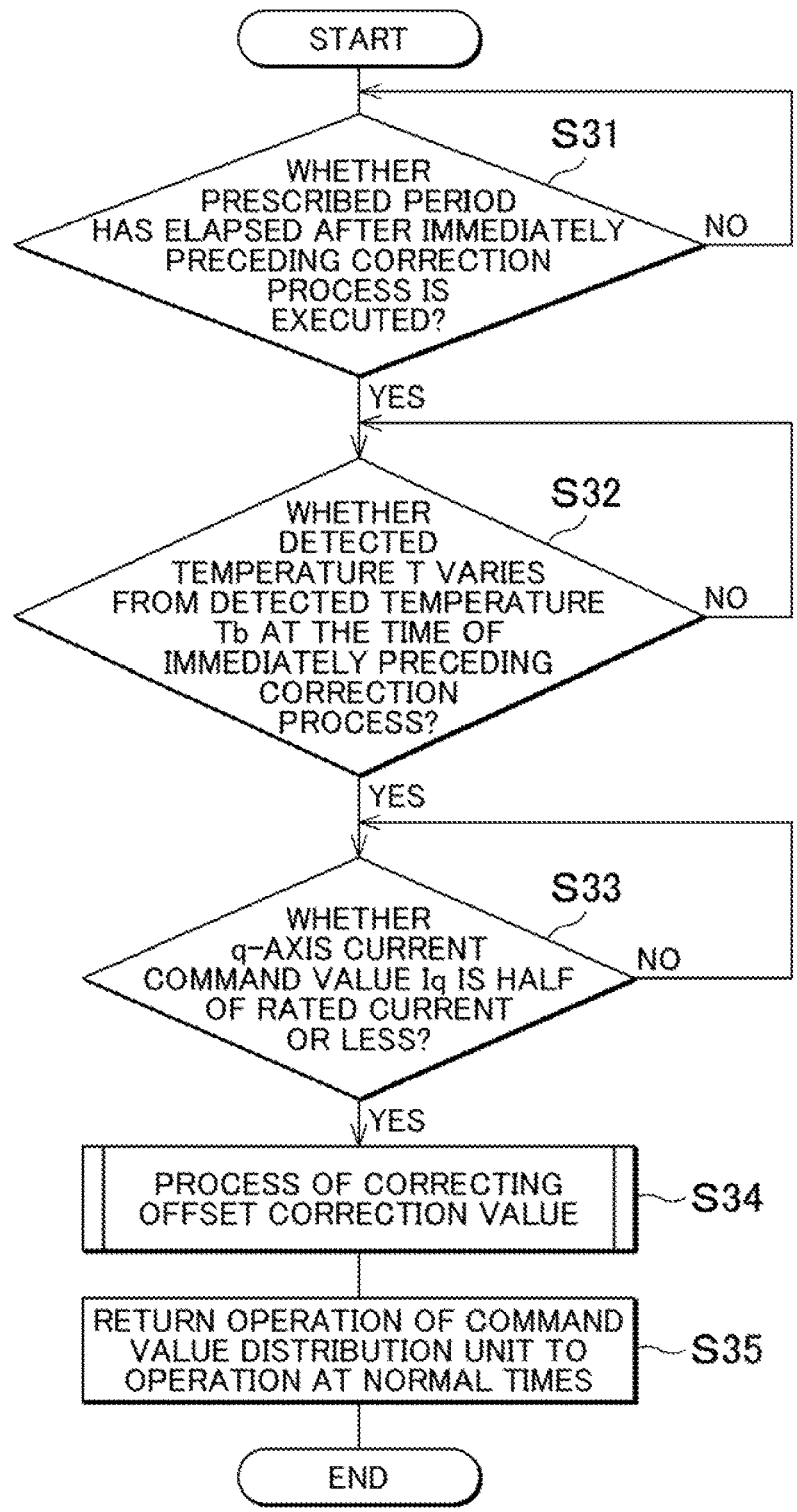
FIG. 6 is a flowchart for describing an operation of the offset correction value setting unit.

FIG. 6 is a flowchart for describing an operation of the offset correction value setting unit. The offset correction value setting unit 50 determines whether a prescribed period has elapsed after an immediately preceding process of correcting an offset correction value (process in step S34, described later) is executed (step S31). When the prescribed period has not elapsed after the immediately preceding process of correcting the offset correction value is executed (NO in step S31), the offset correction value setting unit 50 returns to step S31.

When the offset correction value setting unit 50 determines that the prescribed period has elapsed after the immediately preceding process of correcting the offset correction value is executed (YES in step S31), the offset correction value setting unit 50 proceeds to step S32. The offset correction value setting unit 50 determines in step S32 whether the presently detected temperature T detected by the temperature sensor 24 has varied from a detected temperature Tb at the time of execution of the immediately preceding process of correcting the offset correction value (hereinafter, referred to as "detected temperature Tb in the immediately preceding correction process"). The detected temperature Tb at the time of execution of the immediately preceding correction process is stored in the nonvolatile memory 40 (refer to step S41 in FIG. 7 described later).

When the offset correction value setting unit 50 determines that the presently detected temperature T has not varied from the detected temperature Tb at the time of execution of the immediately preceding correction process (NO in step S32), the offset correction value setting unit 50 returns to step S32. When the offset correction value setting unit 50 determines that the presently detected temperature T has varied from the detected temperature Tb at the time of execution of the immediately preceding correction process (YES in step S32), the offset correction value setting unit 50 determines whether the q-axis current command value Iq calculated by the current command value calculation unit 41 is half of a rated current or less (step S33). The rated current means an amount of current that can be output from the inverters of the two respective systems (driving circuits of the two respective systems). When the q-axis current command value Iq is greater than half of the rated current (NO in step S33), the offset correction value setting unit 50 returns to step S33. When the maximum torque required by the steering system can be output from only the inverter of one system, step S33 may be omitted.

When the offset correction value setting unit 50 determines in step S33 that the q-axis current command value Iq is half of the rated current or less (YES in step S33), the offset correction value setting unit 50 proceeds to step S34 to execute the process of correcting the offset correction value. Details of the process of correcting the offset correction value will be described below. When the process of correcting the offset correction value in step S34 ends, the offset correction value setting unit 50 returns an operation of the command value distribution unit 42 to an operation at normal times (step S35), and then ends the present routine.

FIG. 7 is a flowchart illustrating the detailed procedure of the process (process of correcting an offset correction value) in step S34 in FIG. 6. The offset correction value setting unit 50 acquires the temperature T detected by the temperature sensor 24, and stores the temperature T in the nonvolatile memory 40, as an immediately preceding detected temperature Tb (step S41). Subsequently, the offset correction value setting unit 50 determines whether a corrected value determination flag F has been reset (F=0) (step S42). The corrected value determination flag F is the same as the corrected value determination flag F described with reference to FIG. 4. When the corrected value determination flag F has been reset (F=0) (YES in step S42), the offset correction value setting unit 50 controls the command value distribution unit 42 such that the distribution factor of the two-phase current command value Idq for the first control unit 60A is 100%, and the distribution factor of the two-phase current command value Idq for the second control unit 60B is 0% (step S43). Thus, the command value distribution unit 42 sets the two-phase current command values Iq, Id calculated by the current command value calculation unit 41 as the two-phase current command values Iq_1, Id_1 to be distributed to the first control unit 60A, and sets the two-phase current command values Iq_2, Id_2 to be distributed to the second control unit 60B to zero.

Subsequently, the offset correction value setting unit 50 turns off the second relays 37r, 37s, 37t (step S44). As a result, a current flowing through a power supply path (connecting line) for supplying electric power to the electric motor 18 from the second driving circuit 34 becomes zero. Thus, a current detected by each of the current sensors 35r, 35s, 35t is supposed to be zero regardless of a temperature. The offset correction value setting unit 50 then acquires the three-phase detected currents Ir, Is, It detected by the current sensors 35r, 35s, 35t, respectively (step S45). It is considered that each of the acquired three-phase detected currents Ir, Is, It corresponds to an offset error. Then, the offset correction value setting unit 50 sets the acquired three-phase detected currents Ir, Is, It, in the second detected current correction unit 46B as offset correction values βr, βs, βt, respectively (step S46). Note that, initial values of the offset correction values βr, βs, βt may respectively be offset correction values βr, βs, βt at a reference temperature set in advance (e.g. 25° C.), or other prescribed values.

Subsequently, the offset correction value setting unit 50 returns each of the second relays 37r, 37s, 37t to an on-state (step S47). The offset correction value setting unit 50 sets the corrected value determination flag F (F=1) (step S48), and then proceeds to step S35 in FIG. 6. When the offset correction value setting unit 50 determines in step S42 that the corrected value determination flag F has been set (F=1) (NO in step S42), the offset correction value setting unit 50 controls the command value distribution unit 42 such that the distribution factor of the two-phase current command value Idq for the second control unit 60B is 100%, and the distribution factor of the two-phase current command value Idq for the first control unit 60A is 0% (step S49). Thus, the command value distribution unit 42 sets the two-phase current command values Iq, Id calculated by the current command value calculation unit 41 as the two-phase current command values Iq_2. Id_2 to be distributed to the second control unit 60B, and sets the two-phase current command values Iq_1, Id_1 to be distributed to the first control unit 60A to zero.

Subsequently, the offset correction value setting unit 50 turns off the first relays 36u, 36v, 36w (step S50). As a result, a current flowing through a power supply path (connecting line) for supplying electric power to the electric motor 18 from the first driving circuit 32 becomes zero. Thus, a current detected by each of the current sensors 33u, 33v, 33w is supposed to be zero regardless of a temperature. The offset correction value setting unit 50 then acquires the three-phase detected currents Iu, Iv, Iw detected by the current sensors 33u, 33v, 33w, respectively (step S51). It is considered that each of the acquired three-phase detected currents Iu, Iv, Iw corresponds to an offset error. Then, the offset correction value setting unit 50 sets the acquired three-phase detected currents u, Iv, Iw, in the first detected current correction unit 46A as offset correction values βu, βy, βw, respectively (step S52). Note that, initial values of the offset correction values βu, βv, βw may respectively be offset correction values βu, βv, βw at a reference temperature set in advance (e.g. 25° C.), or other prescribed values.

Subsequently, the offset correction value setting unit 50 returns each of the first relays 36u, 36v, 36w to an on-state (step S53). The offset correction value setting unit 50 resets the corrected value determination flag F (F=0) (step S54), and then proceeds to step S35 in FIG. 6. In the flowchart in FIG. 6, the process in step S32 may be omitted. In this case, the process in step 341 in FIG. 7 is also omitted.

According to the embodiment described above, the offset correction values βu, βv, βw and the offset correction values βr, βs, βt can be corrected without stopping the operation of the electric power steering system 1. Thus, the offset correction values βu, βy, βw and the offset correction values βr, βs, βt can be corrected at substantially regular intervals, and thus errors of the detected currents Iu, Iv, Iw, Ir, Is, It due to temperature can be effectively reduced.

What is claimed is:

1. An electric power steering system comprising:
   an electric motor including a first coil group that consists of three phrase coils and a second coil group that is independent from the first coil group and consists of another three phase coils;
   a first driving circuit configured to supply electric power to the first coil group;
   a second driving circuit configured to supply electric power to the second coil group;
   a first current detector group that consists of a plurality of current sensors configured to detect a current flowing through the first coil group;
   a second current detector group that consists of another plurality of current sensors configured to detect a current flowing through the second coil group; and
   at least one processor programmed to
      control the electric motor via the first driving circuit and the second driving circuit,
      apply a first offset correction to a first group of detected currents detected by the first current detector group, based on a first correction value group that consists of a plurality of correction values corresponding to each current sensor of the first current detector group,
      apply a second offset correction to a second group of detected currents detected by the second current detector group, based on a second correction value group that consists of another plurality of correction values corresponding to each current sensor of the second current detector group,
      calculate a basic current command value of the electric motor,
      divide the basic current command value into a first current command value and a second current command value,
      control the first driving circuit, based on first current values obtained by applying the first offset correction to the first group of detected currents, and the first current command value,
      control the second driving circuit, based on second current values obtained by applying the second offset correction to the second group of detected currents, and the second current command value, and
      correct the first correction value group and the second correction value group by
         i) correcting the second correction value group while 100% of the basic current command value is the first current command value, and 0% of the basic current command value is the second current command value, and
         ii) correcting the first correction value group while 100% of the basic current command value is the second current command value, and 0% of the basic current command value is the first current command value.

2. The electric power steering system according to claim 1, wherein
   the first driving circuit and the second driving circuit are configured so as to have a same maximum current value that each of the first and second driving circuits passes through the first coil group and the second coil group.

3. The electric power steering system according to claim 2, wherein
   the at least one processor controls the electric motor via a d-q axes vector control,
   the d-q axes are orthogonal axes with respect to each other that rotate synchronously with rotation of the electric motor, and
   the basic current command value, the first current command value, the second current command value, the first current values, and the second current values are values in a axes coordinate system.

4. The electric power steering system according to claim 2, further comprising:
   a memory configured to store the first correction value group with respect to a prescribed reference temperature, as a first reference correction value group, wherein
   the at least one processor is further programmed to
      i) provide a first voltage command value to control the first driving circuit, the first voltage command value being such a value that the first group of detected currents detected by the first current detector group is zero when a temperature is the prescribed reference temperature in a state where 100% of the basic current command value is the second current command value, and 0% of the basic current command value is the first current command value, and
      ii) correct the first correction value group based on the first group of detected currents detected by the first current detector group when the first voltage command value is provided to control the first driving circuit, and the first reference correction value group.

5. The electric power steering system according to claim 2, further comprising:
   a first switch configured to open and close a first power supply path for supplying electric power to the first coil group from the first driving circuit; and
   a second switch configured to open and close a second power supply path for supplying electric power to the second coil group from the second driving circuit, wherein
   the at least one processor is further programmed to
      open the first switch in a state where 100% of the basic current command value is the second current command value, and 0% of the basic current command value is the first current command value,
      correct the first correction value group based on the first group of detected currents detected by the first current detector group when the first switch is open,
      open the second switch in a state where 100% of the basic current command value is the first current command value, and 0% of the basic current command value is the second current command value, and correct the second correction value group based on the second group of detected currents detected by the second current detector group when the second switch is open.

6. The electric power steering system according to claim 4, wherein the memory is configured to store the second correction value group with respect to the prescribed reference temperature, as a second reference correction value group, and the at least one processor is further programmed to i) provide a second voltage command value to control the second driving circuit, the second voltage command value being such a value that the second group of detected currents detected by the second current detector group is zero when the temperature is the prescribed reference temperature in a state where 100% of the basic current command value is the first current command value, and 0% of the basic current command value is the second current command value, and ii) correct the second correction value group based on the second group of detected currents detected by the second current detector group when the second voltage command value is provided to control the second driving circuit, and the second reference correction value group.

* * * * *